US012698231B2

(12) United States Patent
Gent et al.

(10) Patent No.: US 12,698,231 B2
(45) Date of Patent: Aug. 4, 2026

(54) GLASS BRIQUETTE AND FORMING SYSTEM

(71) Applicants: Tim Gent, Devon (GB); Simon Etches, Nottinghamshire (GB)

(72) Inventors: Tim Gent, Devon (GB); Simon Etches, Nottinghamshire (GB)

( * ) Notice: Subject to any disclaimer, the term of this patent is extended or adjusted under 35 U.S.C. 154(b) by 0 days.

(21) Appl. No.: 18/191,224

(22) Filed: Mar. 28, 2023

(65) Prior Publication Data

US 2023/0227344 A1      Jul. 20, 2023

Related U.S. Application Data

(63) Continuation of application No. 16/476,156, filed as application No. PCT/GB2018/050014 on Jan. 4, 2018, now abandoned.

(30) Foreign Application Priority Data

Jan. 5, 2017    (GB) ...................................... 1700091
Feb. 7, 2017    (GB) ...................................... 1702001

(51) Int. Cl.
*C03B 29/02*        (2006.01)
*C03B 1/02*         (2006.01)
(Continued)

(52) U.S. Cl.
CPC ................ *C03B 29/02* (2013.01); *C03B 1/02* (2013.01); *C03C 1/002* (2013.01); *C03C 14/004* (2013.01);
(Continued)

(58) Field of Classification Search
CPC ....... C03C 1/002; C03C 1/026; C03C 14/008; C03C 14/00; C03C 14/004;
(Continued)

(56) References Cited

U.S. PATENT DOCUMENTS 3,880,639 A     4/1975   Bodner et al.
4,059,423 A     11/1977  De Vos et al.
(Continued)

FOREIGN PATENT DOCUMENTS

CA         2637475 A1      1/2010
CN         103482848 A     1/2014
(Continued)

OTHER PUBLICATIONS

Machine translation of FR 2662689, Tonthat, Dec. 6, 1991 (Year: 1991).*

(Continued)

*Primary Examiner* — Ian A Rummel
(74) *Attorney, Agent, or Firm* — Maier & Maier, PLLC

(57)        ABSTRACT
A method of producing a glass briquette in which reclaimed glass fines are mixed with a binder material to create a mixture. The mixture is subsequently compressed in a chamber to form a briquette having the shape of the interior of the chamber. The reclaimed glass includes glass fines of a size of smaller than 10 mm. The method is performed without melting the glass fines such that the resulting briquette contains the discrete glass fines held in the binder and may be used as a furnace ingredient for later glass product production. The glass briquette may contain other batch ingredients required in the production of glass.

3 Claims, 2 Drawing Sheets

(51) Int. Cl.

| | | |
|---|---|---|
| *C03C 1/00* | (2006.01) | |
| *C03C 14/00* | (2006.01) | |
| *C03C 25/14* | (2018.01) | |
| *C03C 25/20* | (2006.01) | |
| *C03C 25/42* | (2006.01) | |

(52) U.S. Cl.
CPC .............. *C03C 25/14* (2013.01); *C03C 25/20* (2013.01); *C03C 25/42* (2013.01); *C03C 2201/54* (2013.01); *C03C 2201/60* (2013.01)

(58) Field of Classification Search
CPC . C03C 2201/54; C03C 2201/60; C03C 25/14; C03C 25/20; C03C 25/42; C03C 1/028; C03C 12/00; C03C 2214/12; C03C 1/02; C03B 1/02; C03B 29/02; C03B 3/023; C03B 19/06; C03B 37/14; C03B 5/005; Y02P 40/50; Y02P 40/57; C04B 28/26; C04B 14/22; C04B 20/0076; C04B 30/00; C04B 40/0071; C04B 12/04; C04B 24/18; C04B 14/06; C04B 14/30; C04B 22/064; C04B 22/10; C04B 40/0263; C04B 2111/00267; C04B 32/005; C04B 38/00; C04B 40/0259; C04B 40/0268

See application file for complete search history.

(56) References Cited

U.S. PATENT DOCUMENTS

| | | | |
|---|---|---|---|
| 4,225,443 | A | 9/1980 | Harris et al. |
| 2008/0213591 | A1 | 9/2008 | Meyer et al. |
| 2011/0204540 | A1 | 8/2011 | Webster |
| 2013/0165553 | A1 | 6/2013 | Cuypers et al. |
| 2014/0274652 | A1 | 9/2014 | Mastek et al. |
| 2017/0144912 | A1 | 5/2017 | Isover |
| 2017/0217837 | A1 | 8/2017 | Brunk |

FOREIGN PATENT DOCUMENTS

| | | | |
|---|---|---|---|
| EP | 0 116 857 | A1 | 8/1984 |
| FR | 2662689 | A | 12/1991 |
| GB | 2 011 376 | A | 7/1979 |
| JP | 2000086256 | A | 3/2000 |
| JP | 2001-302262 | A | 10/2001 |
| JP | 2006-160570 | A | 6/2006 |
| KR | 20030069129 | A | 8/2003 |
| WO | 00/29345 | A1 | 5/2000 |
| WO | 01/00916 | A1 | 1/2001 |
| WO | 2010/004049 | A1 | 1/2010 |
| WO | 2011/092296 | A1 | 8/2011 |

OTHER PUBLICATIONS

Machine translation of WO 2011092296, Hamdan et al., Aug. 4, 2011 (Year: 2011).*

Min'Ko et al., "Effect of Finely Disperse Cullet on Glass Batch Briquetting", Science for Glass Production, Glass and Ceramics, Sep. 18, 2008, vol. 65, Nos. 9-10, pp. 305-309.

Examination Report issued on May 28, 2020 in corresponding Application No. GB1700091.0; 2 pages.

Search Report issued on Jul. 6, 2017 in corresponding Application No. GB1700091.0; 5 pages.

Search Report issued on Jul. 27, 2017 in corresponding Application No. GB1702001.7; 5 pages.

International Preliminary Report on Patentability (Chapter I) dated on Jul. 18, 2019, of corresponding International application No. PCT/GB2018/050014; 8 pages.

Indian Office Action issued on Jan. 27, 2021, in connection with corresponding IN Application No. 201937031411; 5 pages.

International Search Report and written Opinion issued on Apr. 10, 2018 in corresponding International application No. PCT/GB2018/050014; 12 pages.

* cited by examiner

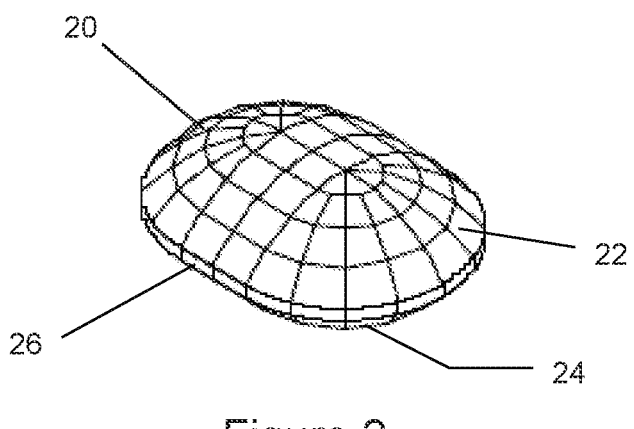
Figure 2
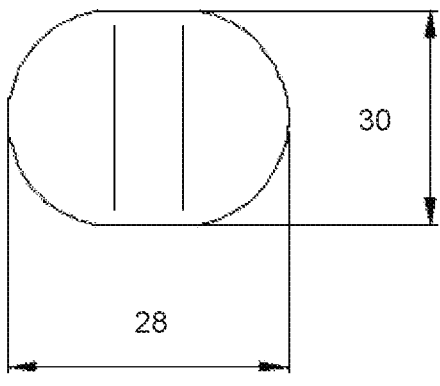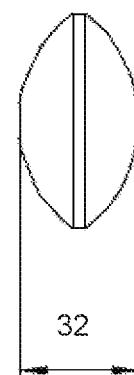
Figure 3A
Figure 3B        Figure 3C

GLASS BRIQUETTE AND FORMING SYSTEM

CROSS-REFERENCE TO RELATED APPLICATIONS

This application is a Continuation of U.S. application Ser. No. 16/476,156, filed Jul. 5, 2019, which is a National Stage Entry of International Application No. PCT/GB2018/050014, filed Jan. 4, 2018, and claims the benefit of priority from United Kingdom Application No. 1702001.7, filed Feb. 7, 2017, and United Kingdom Patent Application No. 1700091.0, filed Jan. 5, 2017, the entire contents of which are incorporated herein by reference.

FIELD

The present invention relates to glass recycling, and in particular to the formation of briquettes from small particles of glass.

In an effort to drive recycling, it has become common for authorities to collect or accept mixed recyclable materials. Rather than requiring individuals or businesses to completely sort their waste into plastics, paper, glass etc at source, the mixed or co-mingled recyclables are taken to a Materials Recovery Facility (MRF) for separation and processing prior to being recycled.

BACKGROUND

Producing bottles and other glass products from recycled glass requires less energy input than working from raw materials, so is clearly desirable. However, problems can arise if contaminants such as paper labels, plastic or metal caps or lids and ceramic stones and porcelain (CSP) are present in the crushed glass product or cullet. These problems are typically more pronounced with glass obtained from a Materials Recovery Facility (MRF glass), where contaminants can often be present in unacceptable amounts in the crushed glass when it arrives. Impurities in the raw glass product can cause unwelcome chemical reactions during melting and thus make the product unsuitable for recycling. In some cases, the impurities can also cause damages to the furnaces used.

Various processing and cleaning methods for separating recoverable glass from MRF glass are known, but are generally inefficient. For example, screening the product is ineffective where there is little difference between the particle size of the glass cullet and the contaminants and/or where moisture is present causing the contaminants to stick to the glass. Separation by weight/density can be effective for lightweight contaminants, and ferrous metals can be removed using magnets, but contaminants such as CSP and non-ferrous metals which may have similar densities to glass would not be removed.

These remaining contaminants, and many others, are less susceptible to breakage than glass, so one option would be to crush the glass cullet to a smaller particle size and then filter or screen the resulting material. This helps to ensure that there is a difference between the particle size of the glass and that of CSP or other contaminants prior to filtering/screening, such that the CSP or other contaminants can be separated from the glass more easily. Small particles (<5 mm) of contaminants that remain in the cullet after this process will often melt in the heat of the furnace or pass through without causing significant problems. However, Larger (around 10-15 mm) non-melt particles, of metal or CSP for example, have the potential to block the shear blade during processing of the molten glass. In extreme cases, this can lead to a blow back of molten glass from the furnace, representing a significant health and safety risk to operators. As such, even if the crushing operation fails to remove all of the remaining contaminants from the glass cullet, the removal or crushing of larger pieces is beneficial to the overall glass production process.

The key drawback of this approach is that glass particles or 'fines' of <10 mm are generally not desirable, so much so that they are often sorted out of MRF glass at an early stage of processing. Among other things, there can be difficulties handling, storing and transporting the smaller particles, particularly finely ground or powdery material. The behaviour of glass fines during onward processing is also complicated. For example, there is a risk that the glass fines could be disturbed or agitated by jets of air used in a subsequent cleaning or sorting process or convection airflow within a furnace. The melt behaviour of glass fines and their reaction within a furnace is also unpredictable.

In the furnace, the recycled glass (in the form of glass fines or cullet) is combined with the raw materials for glass: silica, sodium carbonate, calcium oxide and any other additives, the raw materials having been pre measured in a process known as batch processing, before they are deposited in the furnace. Typically, even in high quality glass, a proportion of recycled glass is added to the furnace as it aids in the melting process, reducing the amount of energy required. The proportion of cullet added depends on the type of glass being produced, but is typically from about 15-80% by weight. However, regardless of the proportion of cullet, in order to obtain a reliable product the relative proportions of raw material and glass cullet, and the composition of the cullet, must be kept consistent. The managing of a range of ingredients of different type, mass, density and volume, as well as the need to homogenously combine powder or granular batch ingredients with the cullet, leads to a significant risk of errors and inconsistencies during processing, as well as requiring a substantial investment of time and man power.

As a result of the various problems outlined above, it is quite common for MRF glass, particularly the smaller particles or fines, to be sent for use as an aggregate material in the building industry rather than being fully recycled into new glass products as would be preferable.

SUMMARY

It is therefore an aim of the invention to overcome or mitigate the abovementioned problems and allow or simplify the recycling of MRF glass.

According to a first aspect of the invention there is provided a method of forming a glass briquette as defined in the appended claim 1. Further optional features of the method are recited in the associated dependent claims.

The method comprising the steps of mixing reclaimed glass, comprising glass fines of a size of smaller than 10 mm, with a binder material to create a mixture, and subsequently compressing said mixture in a chamber to form a briquette having the shape of the interior of the chamber. The use of a binder material and the application of pressure helps to ensure that robust briquettes are formed from the reclaimed glass fines.

The reclaimed glass may comprise MRF glass, mixed glass or any other post-consumer glass, ie glass that has had at least one prior use.

Smaller glass fines, for example 5 mm, 2 mm, 1 mm may also be reclaimed and used in the method of the invention.

The chamber may be formed from a pair of opposing cavities, for example using a press comprising a pair of counter-rotating rollers with one of said pair of opposing cavities is provided as a pocket on the outer circumference of each roller.

Each roller may comprise a plurality of pockets, for example a plurality of rows of pockets provided across a width of the roller. For example, between 1 and 5 rows may be provided, and the total number of pockets may be as many as 268, 420 or more.

The binder material may be sprayed onto the reclaimed glass and/or may comprise a lignosulfonate (a sulfonate of lignin) or sodium silicate (often referred to as liquid glass).

The mixing step may comprise mixing in a ploughshare mixer.

The method may further comprise the step of crushing reclaimed glass to provide glass fines of a size of smaller than 10 mm, 5 mm, 2 mm or 1 mm; said crushing step being performed prior to the mixing step. The initial crushing step may be of assistance in separating contaminants from the reclaimed glass, allowing higher quality glass products to be produced and/or avoiding potential health and safety issues.

The method may further comprise the step of separating any loose material from the briquette formed in compressing step, for example by moving the briquette formed in the compressing step, and any remaining loose material, across a screen. Any separated loose material separated at this stage could be returned to the mixing step of the compressing step for re-use.

A time delay may be introduced between the compressing step and the separating step. For example, the briquette may pass along a conveyor between these two steps. The delay may provide some time for the briquette to cure, improving its properties.

The mixture may comprise less than 10% by weight of binder material to avoid introducing unnecessary impurities into the glass in the briquette. The mixture may comprise from 2-5% by weight of binder material, for example 4% by weight of binder material.

The method, e.g. the mixing and/or compressing steps, may be performed at a temperature below the melting point of the reclaimed glass. That is to say, the briquette may be formed in which the discrete glass fines remain present as solid particulate material but contained with the binder in the shape of the briquette. Any, or all of the method steps may be performed at ambient temperature or at an elevated temperature above ambient temperature but below the melting point of the reclaimed glass. Any, or all of the previously described steps may be performed at a temperature below 500° C., 400° C., 300° C., 200° C., 100° C. or 50° C.

The method is used to produce a briquette product that is intended to be later used in a furnace. That is to say the briquette is may be a glass furnace ingredient and the method of the present invention can thus be distinguished from methods of forming end glass products, which would require melting in a furnace. The glass briquette may similarly be distinguished from end glass products since the briquette is a collection of discrete materials held in a binder as a mixture.

The method may further comprise the step of transferring the briquette to an oven for drying. Drying may be performed at an elevated temperature, e.g. above 50° C., 70° C. or 100° C.

The glass briquette comprises a compressed mixture of discrete reclaimed glass and from 1-10% by weight of a binder material. The reclaimed glass comprises glass fines of a size of smaller than 10 mm.

The mixture may comprise from 2-5% by weight of a binder material, for example 4% by weight of a binder material to avoid introducing unnecessary impurities.

The reclaimed glass may comprise glass fines of a size of smaller than 2 mm or 1 mm. The binder material may comprise a lignosulfonate (a sulfonate of lignin) or sodium silicate (often referred to as liquid glass).

The glass briquette may be formed using a method as previously described.

According to a further aspect of the invention there is provided a glass briquette comprising a compressed mixture of reclaimed glass, silicone dioxide, sodium carbonate, calcium oxide or a source thereof, and a binder material.

The glass briquette of the invention contains calcium oxide (CaO) or a source thereof. A source of CaO is a compound which will break down under manufacturing conditions to produce CaO, eg calcium carbonate (limestone; $CaCO_3$).

The glass briquette of the first aspect preferably comprises less than 10% by weight of a binder material, for example from 1-10% by weight of a binder material. More preferably, the glass briquette comprises from 1-8% by weight of a binder material, more preferably from 2-5% by weight of a binder material, for example about 4% by weight of a binder material, to avoid introducing unnecessary impurities.

The binder material may comprise a lignosulfonate (sulfonated lignin) or sodium silicate (often referred to as liquid glass). Preferably, the binder material is sodium silicate.

The amount of reclaimed glass (cullet) present in the glass briquette is dependent on the desired quality or intended use of the glass produced from the briquette, and higher quality glass may contain a lower proportion of cullet. However, even in high quality glass, the inclusion of at least 15% by weight of cullet is advantageous as it can reduce the quantity of raw materials required, aid in melting and reduce the temperature needed in the furnaces. The proportion of reclaimed glass present in the briquette can be adjusted to suit the desired end use. Typically, the glass briquette of the first aspect of the invention comprises from 10-90% by weight of reclaimed glass, preferably from 15-90% by weight of reclaimed glass. More preferably, the glass briquette comprises from 15-60% by weight of reclaimed glass.

The amount of silicone dioxide, sodium carbonate, and calcium oxide or a source thereof is dependent on the desired quality or intended use of the glass produced from the briquette. Typically, the glass briquette comprises from 1-80% by weight of silicone dioxide, more preferably from 5-60% by weight of silicone dioxide. Typically, the glass briquette comprises from 0.1-25% by weight of sodium carbonate, more preferably from 1-15% by weight of sodium carbonate. Typically, the glass briquette comprises from 0.1-20% by weight of calcium oxide or a source thereof, more preferably from 0.5-10% by weight of calcium oxide or a source thereof.

The glass fines used in the briquette of the invention are typically of a size smaller than 10 mm. The reclaimed glass may comprise or consist of glass fines of a size smaller than 5 mm, 2 mm, or 1 mm. The reclaimed glass used in the glass briquette is typically crushed or ground into small particles, which may constitute the glass fines.

Other additives may also be included in the glass briquette, depending on the properties required in the final glass product. Typical additives which may be included are: aluminium oxide, antimony oxide, arsenic trioxide, barium, barium oxide, boron oxide, cerium (IV) oxide, cobalt oxide, copper oxide, ferric oxide, iron, lanthanum oxide, lead oxide, magnesia, magnesium oxide, nickel oxide, selenium oxide, selenites, selenates, silver oxide, sodium chloride, sodium nitrate, sodium sulfate, sulfur trioxide and tellurium oxide. Preferably, any additional additives such as those described above are present in the briquette in a total amount of less than about 10% by weight, eg from 0.1-10% by weight. More preferably, such additional additives are present in a total amount of less than about 5% by weight, eg from 0.1-5% by weight.

According to a further aspect of the invention there is provided a method of forming a glass briquette comprising: mixing reclaimed glass with silicone dioxide, sodium carbonate and calcium oxide or a source thereof, adding a binder material to create a mixture, and subsequently compressing said mixture in a chamber to form a briquette having the shape of the interior of the chamber.

The use of a binder material and the application of pressure may help to ensure that robust briquettes are formed from the reclaimed glass fines.

The reclaimed glass and batch materials (silicone dioxide, sodium carbonate and calcium oxide) may be mixed together prior to the addition of the binder.

The reclaimed glass preferably comprises glass fines of a size of smaller than 10 mm. Smaller glass fines, for example 5 mm, 2 mm, 1 mm may also be reclaimed and used in the method of the invention.

Any of the optional features of the method of the first aspect or briquette product of the second aspect may be used in conjunction with the method or briquette of the further aspects.

The mixture may typically comprise from 15-90% by weight of reclaimed glass, preferably from 15-60% by weight of reclaimed glass.

The mixture may typically comprise from 1-80% by weight of silicone dioxide, more preferably from 5-60% by weight of silicone dioxide. The mixture may typically comprise from 0.1-25% by weight of sodium carbonate, more preferably from 1-15% by weight of sodium carbonate. The mixture may typically comprise from 0.1-20% by weight of calcium oxide or a source thereof, more preferably from 0.5-10% by weight of calcium oxide or a source thereof.

Other additives may also be included in the mixture. Typical additives which may be included are: aluminium oxide, antimony oxide, arsenic trioxide, barium, barium oxide, boron oxide, cerium (IV) oxide, cobalt oxide, copper oxide, ferric oxide, iron, lanthanum oxide, lead oxide, magnesia, magnesium oxide, nickel oxide, selenium oxide, selenites, selenates, silver oxide, sodium chloride, sodium nitrate, sodium sulfate, sulfur trioxide and tellurium oxide. Preferably, any additional additives such as those described above are present in the mixture in a total amount of less than about 10% by weight, eg from 0.1-10% by weight. More preferably, such additional additives are present in a total amount of less than about 5% by weight, eg from 0.1-5% by weight.

Wherever practicable, any of the essential or preferable features defined in relation to any one aspect of the invention may be applied to any further aspect. Accordingly, the invention may comprise various alternative configurations of the features defined above.

BRIEF DESCRIPTION OF THE DRAWINGS

Practicable embodiments of the invention are described in further detail below by way of example only with reference to the accompanying drawings, of which:

FIG. 2 illustrates the form of a briquette formed with the system of FIG. 1; and FIG. 3A shows standard projection of the views of the briquette illustrated in FIG. 2.

FIG. 3B shows standard projection of the views of the briquette illustrated in FIG. 2.

FIG. 3C shows standard projection of the views of the briquette illustrated in FIG. 2.

DETAILED DESCRIPTION

Figure 1:
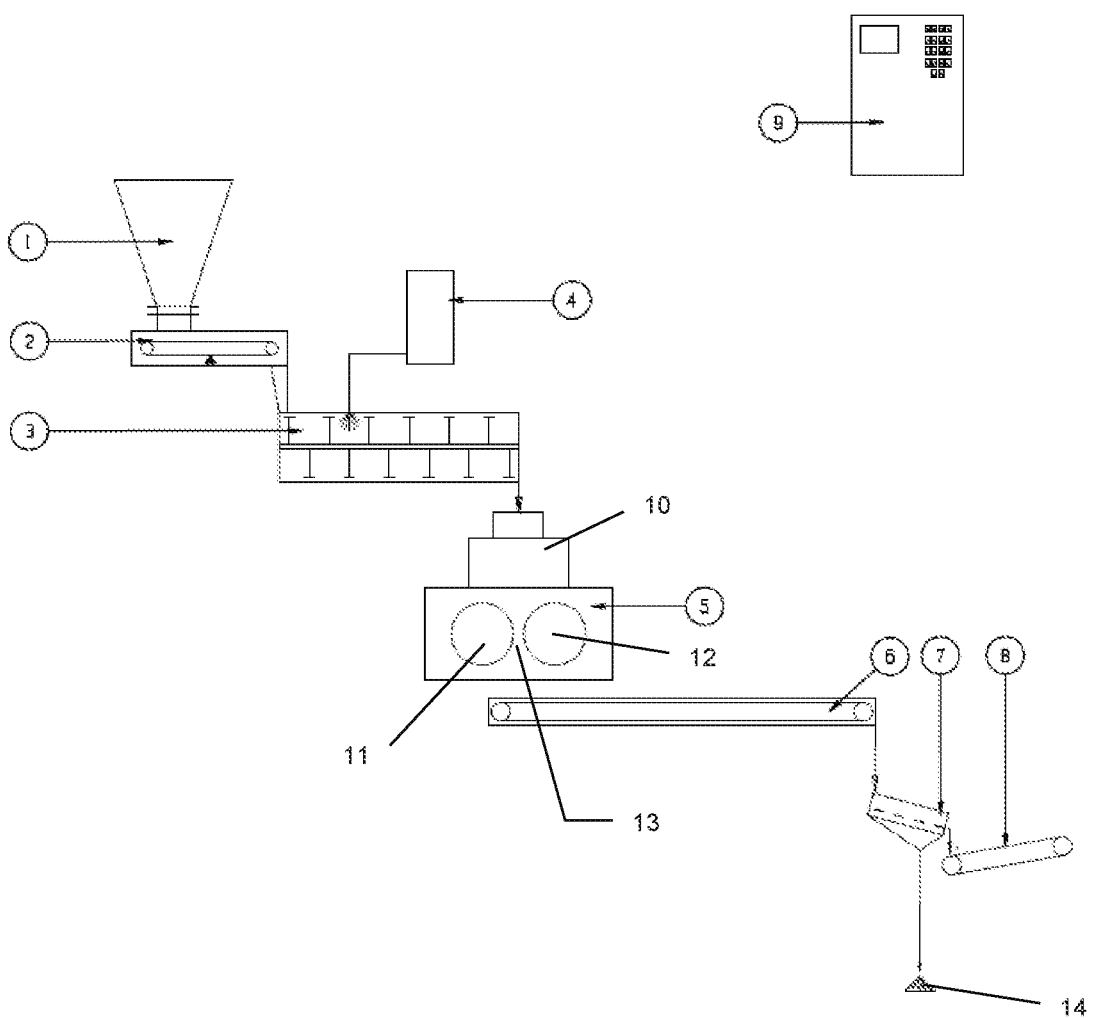
FIG. 1 shows a schematic view of an example briquette forming plant according to the present invention.

The briquette forming plant of FIG. 1 comprises a hopper 1, for receiving raw material, which feeds out onto a weighing/dosing conveyor 2. The raw material comprises crushed glass with a small grain/particle size of less than 10 mm, which would typically be considered glass fines not suitable for processing, silicone dioxide, sodium oxide and calcium oxide or a source thereof. In one particular example the raw material comprises MRF glass that has been crushed to a grain/particle size of less than 2 mm and screened to remove larger pieces of harder or more resilient contaminants that survived the crushing operation.

A weighing/dosing conveyor 2 transfers the material from the hopper 1 into a ploughshare mixer 3, where it is mixed with a binder material such as sodium silicate or a lignosulfonate (sulfonated lignin) which is sprayed into the mixer 3 from a spraying system 4.

Once mixed, the raw material and binder material passes into a briquetting press 5 where pressure is applied to form briquettes from the mixture. A further, intermediate, conveyor 6 then transfers the briquettes to a screen 7, across which the briquettes pass before they reach a final conveyor 8 which transfers the briquettes to an oven for drying or simply to a storage or transport container.

A power drive and control cabinet 9, for driving and controlling the process, is also illustrated.

The briquetting press 5 takes comprises a gravity feeder 10 and a pair of counter-rotating tyres/rollers 11,12, each of which is provided with a plurality of cavities or pockets around their circumference. In one example, each tyre 11,12 has a diameter of 800 mm and a width of 180 mm, and is provided with five rows of eighty-four pockets. The pockets on the tyres 11,12 align with each other as the tyres 11,12 rotate to produce four hundred and twenty individual chambers for forming individual briquettes for every complete rotation of the tyres 11,12. An off-load gap 13 is provided between the tyres 10,11.

The mixture from the ploughshare mixer 3 passes into the gravity feeder 10 of the press 5 and is drawn between the tyres 11,12 and compressed into the chambers to form a number of briquettes. As the pockets of the tyres move apart again the briquettes are deposited onto the intermediate conveyor 6, together with any mixture or loose glass fines that passed through the press 5 without being compressed.

The intermediate conveyor 6 provides time for the briquettes to cure and stabilise once formed. The screen 7 then separates out any loose mixture and glass fines from the briquettes so that only whole briquettes are transferred to the final conveyor 8 while the uncompressed mixture and loose glass fines pass through the screen 7 and are collected below 14.

Various aspects of the illustrated briquette forming plant can be adjusted if required using the control cabinet 9. For example, the speed of rotation of the tyres 11, 12 in the press 5 may be altered, as can the applied pressure and off-load gap 13. The volume of binder applied by the sprayer 4 could also be modified, and the speed of the various conveyors 2,6,8 could be adjusted either to adjust the overall production rate or simply to increase or decrease the curing time on the intermediate conveyor 6.

FIG. 2 shows the form of an example briquette 20 formed according to the present invention. The briquette 20 has curved upper and lower surfaces 22,24 which correspond to the shape of the opposing pockets provided on the tyres 11,12. The upper and lower surfaces 22,24 are separated by an edge section 26 which is formed as a result of the off-load gap 13 between the tyres 11,12.

The curved upper and lower surfaces 22,24 and the edge section 26 are more clearly shown in the side view of FIG. 3A. The plan view of FIG. 3B shows that the length 28 and width 30 of the example briquette 20 are 36 mm and 27.8 mm respectively. The depth 32, as shown in the end view of FIG. 3C is 15.5 mm. This represents a briquette volume of 8 cm$^3$.

The briquetting process of the invention was tested using a raw product of crushed glass mixed with various amounts of sodium silicate binder. The crushed glass used in the tests had a grain size of <2 mm, a bulk density of 1.38 g cm$^{-3}$ and a moisture content of 0.47%.

All tests were conducted with 100% raw product in the mixture, ie with zero recycled fines, at ambient temperature throughout the forming process.

The press comprised a gravity feeder and a pair of counter-rotating tyres/rollers, and was similar to the press 5 described with reference to FIG. 1. However, in the experiments the tyres were 600 mm in diameter and 145 mm wide. Two hundred and sixty-eight pockets were provided per tyre, each measuring 36×26×14.5 mm giving a pocket volume of 7 cm$^3$. The off-load gap, ie the adjustment gap between the tyres in the press to prevent damage to the tyres, was consistently set at 1 mm.

The adjustment pressure for the press was uniformly 10 kilonewtons per linear centimetre (kN lcm$^{-1}$) lower than the listed operating pressure. Although some pressure adjustment is achievable by varying the off-load gap, separate pressure adjustment means were provided.

In tests 1 to 10 a flap of the gravity feeder was opened 20%. In test 11 the flap of the gravity feeder was opened 35% to provide a difference in throughput/flowrate.

Test 12 was a production test of 300 kg of briquettes, and the gravity feeder was opened 35%.

A drop test was performed, from around 1 m, on briquettes from each of tests 1 to 11. The briquettes were then dried in a variety of different ways, and crush tests were performed on briquettes from tests 6 to 9. The results of the tests are summarised below.

TEST 1—50 kg of Raw Product+8% (by Weight) of Sodium Silicate

TEST 2—50 kg of Raw Product+6% of Sodium Silicate

TEST 3—50 kg of Raw Product+4% of Sodium Silicate

In each of the first three tests the briquettes obtained were well shaped, particularly in the middle rows, but rather fragile at the drop test. Ten briquettes were dried in an oven at 100° C. for one hour, resulting in very hard briquettes.

TEST 4—50 kg of Raw Product+2% of Sodium Silicate

Compared to tests 1 to 3 the briquettes produced were more fragile, at the press outlet, with a dry appearance. Ten briquettes were again dried in an oven at 100° C. for one hour, but the briquettes remained less hard and crumbled more readily than in the previous tests.

TEST 5-50 kg of Raw Product+8% of Sodium Silicate

The results were generally in line with test 1, producing well shaped and good quality briquettes. Despite the higher operating pressure of the press, the briquettes weren't noticeably harder than the briquettes from test 1. Drying ten briquettes in an oven at 100° C. for one hour again produced very hard briquettes.

TEST 6-50 kg of Raw Product+4% of Sodium Silicate

As expected, well shaped and good quality briquettes were produced as in test 3, which was performed using the same variable values. In test 6, the briquettes were placed in an oven at 100° C. and crush tests were then performed, typically on two briquettes, at the furnace outlet after different time periods. The results were as follows:

10 min—56 kg, 63 kg
    20 min—100 kg, 98 kg
    30 min—92 kg, 95 kg
    40 min—95 kg, 98 kg
    50 min (1 briquette)—102 kg TEST 7-50 kg of Raw Product+4% of Sodium Silicate Test 7 was performed using the same product and binder amounts as test 6, but with the press at a lower operating pressure. This produced briquettes that were well shaped, but more fragile at the press outlet. As in test 6, the briquettes were then placed in an oven at 100° C. and crush tests were performed on pairs of briquettes at the furnace outlet after different time periods, with the following results:

10 min—No result
    20 min—No result

| | PRODUCT | | PRESS CHARACTERISTICS | | | | | | |
| --- | --- | --- | --- | --- | --- | --- | --- | --- | --- |
| | Bulk | Moisture | Operating | Rolls | | | BRIQUETTE PROPERTIES | | |
| TEST # | Density (g cm$^{-3}$) | Content (% H$_2$O) | Pressure (kN lcm$^{-1}$) | Speed (rpm) | Power (A) | Weight (g) | Volume (mm$^3$) | Density (g cm$^{-3}$) | Thickness (mm) |
| 1 | 0.98 | 4 | 60 | 5 | 53 | 25 | 11.2 | 2.23 | 6 |
| 2 | 0.97 | 3.3 | 60 | 5 | 50 | 26.7 | 12.2 | 2.19 | 6.5 |
| 3 | 0.98 | 2.2 | 60 | 5 | 51 | 26.9 | 11.9 | 2.26 | 7 |
| 4 | 0.99 | 1.16 | 60 | 5 | 53 | 26.6 | 11.7 | 2.27 | 7.2 |
| 5 | 0.98 | 4.2 | 80 | 5 | 65 | 25.6 | 11.6 | 2.21 | 6 |
| 6 | 0.98 | 2.5 | 60 | 5 | 50 | 26.8 | 12 | 2.23 | 6.8 |
| 7 | 0.98 | 2.4 | 40 | 5 | 46 | 26.6 | 12.1 | 2.2 | 7 |
| 8 | 0.98 | 3.3 | 40 | 5 | 45 | 27 | 12.5 | 2.16 | 6.7 |
| 9 | 0.98 | 4 | 60 | 5 | 54 | 27.7 | 12.6 | 2.2 | 6.5 |
| 10 | 0.98 | 4.37 | 60 | 5 | 50 | 28.5 | 12.9 | 2.21 | 6.5 |
| 11 | 0.98 | 4.21 | 60 | 10 | 46 | 27.7 | 12.7 | 2.19 | 6.5 |
| 12 | 0.98 | 4.09 | 60 | 5 | 51 | 27.5 | 12.5 | 2.2 | 6.5 |

30 min—102 kg, 100 kg 40 min—94 kg, 97 kg 50 min—106 kg, 102 kg

TEST 8-50 kg of Raw Product+6% of Sodium Silicate

This test was performed at the same operating pressure as test 7, but with the amount of binder material increased. The briquettes obtained were again well shaped, but crumbled more easily. The crush test results after periods in 100° C. oven were:

10 min—58 kg, 56 kg 20 min—70 kg, 73 kg 30 min—87 kg, 78 kg 40 min—53 kg, 55 kg

TEST 9-50 kg of Raw Product+8% of Sodium Silicate

Test 9 replicated the conditions and variable values used in test 1, and once again good quality briquettes were obtained. Crush tests were performed on cold briquettes both after heating as before and on unheated briquettes as follows:

After 10 min at 100° C. in the oven-66 kg, 65 kg, 68 kg

After 20 min at 100° C. in the oven-101 kg, 94 kg, 120 kg

After 15 hours at ambient temperature (10° C.)—20 kg, 21 kg, 23 kg, 21 kg

TEST 10-50 kg of Raw Product+8% of Sodium Silicate

The test conditions again matched those of test 1. 20 kg of briquettes were put in the oven at 100° C. for 20 minutes and then crush tests were performed on both warm and cold briquettes for comparison:

Warm briquettes—62 kg, 64 kg, 63 kg, 71 kg

Cold briquettes—106 kg, 94 kg, 100 kg, 96 kg

TEST 11-50 kg of Raw Product+8% of Sodium Silicate

The test conditions for test 11 matched those for test 1, with the exception that the rotational speed of the press was doubled to 10 rpm. Well shaped and good quality briquettes were still obtained, although a relatively larger percentage (around 10% of the total material) passed through the press as fines without being formed into briquettes.

The experimental results, particularly from tests 3 and 6, show that the proposed method is quite capable of producing briquettes from glass fines with a particle/grain size of under 2 mm. Indeed, briquettes could similarly be formed from smaller grain sizes of 1 mm or below. Once formed into briquettes, the glass can be handled, stored, transported and used far more easily.

It is envisaged that the resulting briquettes would generally be processed into products such as glass fibre or glass blocks where a lower purity is required. However, with appropriate sorting and decontamination it would be possible to use the same process to produce higher quality products such as bottles and other containers.

Although developed primarily to address problems associated with contaminated MRF glass, there is no reason why the method of the present invention could not be used with glass fines from other sources that would otherwise be deemed too difficult to process in a recycling operation, or simply to improve the appearance and/or simplify the handling of the glass cullet. There may be no need to crush the glass as an initial step, for example where the source material consists of clean glass fines that has been separated from larger pieces. Indeed, it would be quite possible for any glass fines 14 collected at the screening stage 7 in FIG. 1 to be fed back into the hopper 1 to minimise waste.

Various types of glass that would otherwise be discarded or lost to the cycle of glass production can therefore be reclaimed due to the present invention.

The glass briquettes of the type described above may combine reclaimed glass, or cullet, with the batch ingredients required for making glass. A binder is used to hold the components together in a briquette form. The glass briquette of the invention thus contains all of the components required in the production of glass, and can be used in the glass furnace without the need to include additional ingredients. This removes the need for batch processing of the raw ingredients on site, reducing processing time and the opportunity for errors to be introduced. This results in a more efficient manufacturing process, and a more consistent product. The relative proportions of the different components within the briquette may be adjusted according to the needs of the end user, and the desired properties and function of the glass.

The process of glass manufacture is well established. Typically, the raw materials (silicone dioxide (silica, $SiO_2$), sodium carbonate ($Na_2CO_3$), calcium oxide (lime, CaO) or a source thereof, cullet, and any additives) are combined in the furnace at temperatures of up to 1,600° C., where they are melted, fined (to remove gas bubbles) and homogenised, before being cooled to a working temperature to allow the molten glass to be shaped.

Within the furnace the molten glass undergoes a redox reaction, the extent of the reaction (and oxidation state of the glass melt) depending on the conditions within the furnace, the recipe used and the composition of the cullet. The oxidation state of the glass melt affects a wide range of factors, including the efficiency of the process, product quality, foaming, heat transfer, forming (moulding) properties and optical properties (eg glass colour). It is believed that the oxygen activity of the glass melt determines the valency state of any multivalent ions in the glass melt, eg iron. Thus, there is a strong relationship between the oxidation state of the glass melt and the ratio of $Fe^{2+}$ and $Fe^{3+}$ to Fe in the final glass. As an example of the effect of oxidation state, a more oxidised glass melt will produce a lighter coloured, greener glass, and a more reduced melt will result in darker, amber coloured glass.

It is also believed that there is a correlation between the temperature of the melt at the bottom of the melting tank, and the redox state of the glass melt. A more reduced melt typically results in higher temperatures at the bottom of the melting tank, which results in better heat transfer, and thus lower energy usage.

Controlling the redox reaction can therefore help ensure that the glass produced is of the desired quality, and has the required properties. The use of pre-prepared glass briquettes containing all of the ingredients required in the glass production process, and which may be produced according to a specific recipe for an end user, has clear advantages. It may enable combined control of both the cullet composition and batch recipe and their relative ratios, thus ensuring consistency of output throughout production, and enabling better control of the oxidation state of the glass melt within the furnace.

The invention claimed is:

1. A glass briquette, consisting of: a compressed mixture of reclaimed glass fines of a size of smaller than 10 mm and having 1-8% by weight of a binder material comprising a lignosulphate and/or sodium silicate, wherein the reclaimed glass comprises glass fines present as discrete, solid particulate material contained with the binder of the compressed mixture and the glass briquette is capable of withstanding a drop test from a height of 1 m.

2. The glass briquette according to claim 1, wherein the mixture of reclaimed glass comprises 4% by weight of the binder material.

3. The glass briquette according to claim 1, wherein the mixture of reclaimed glass comprises glass fines of a size of smaller than 2 mm.

* * * * *